(12) United States Patent
Anderson (10) Patent No.: US 7,349,832 B2
(45) Date of Patent: Mar. 25, 2008

(54) WATER PARTICLE MANIPULATION

(75) Inventor: John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 570 days.

(21) Appl. No.: 10/780,847

(22) Filed: Feb. 17, 2004

(65) Prior Publication Data

US 2005/0182610 A1    Aug. 18, 2005

(51) Int. Cl.
*G06G 7/50*    (2006.01)

(52) U.S. Cl. .................. 703/9; 703/2; 703/6; 345/473; 345/474

(58) Field of Classification Search .................... 703/2, 703/6, 9; 345/473, 474
See application file for complete search history.

(56) References Cited

U.S. PATENT DOCUMENTS

| | | | |
|---|---|---|---|
| 5,537,641 A * | 7/1996 | da Vitoria Lobo et al. . | 345/419 |
| 5,877,777 A * | 3/1999 | Colwell ...................... | 345/473 |
| 6,266,071 B1 * | 7/2001 | Stam et al. ................. | 345/473 |
| 7,085,689 B2 * | 8/2006 | Davis et al. .................... | 703/2 |

OTHER PUBLICATIONS

O'Brien et al., "Dynamic Simulation of Splashing Fluids", Proceedings of the Computer Animation, Apr. 1995.*
Mould et al., "Modeling Water for Computer Graphics", Computers & Graphics, vol. 21, Issue 6, 1997, pp. 801-814.*
Muller et al., "Particle-Based Fluid Simulation for Interactive Applications", Proceedings of the 2003 ACM SIGGRAPH/Eurographics Symposium on Computer Animation, Jul. 2003.*
Premoze et al., "Particle-Based Simulation of Fluids", Eurographics 2003, Sep. 2003.*
Enright, Douglas et al.; "A Hybrid Particle Level Set Method for Improved Interface Capturing"; *Journal of Computational Physics* 2002 vol. 183 pp. 83-116.

(Continued)

*Primary Examiner*—Kamini Shah
*Assistant Examiner*—Herng-der Day
(74) *Attorney, Agent, or Firm*—Law Office of Jonathan Hollander PC (57) ABSTRACT

Realistic sprays for simulated fluids are created by adding a set of spray particles to a boundary region just below the fluid surface. The fluid surface is determined by solving a level set equation for a zero level corresponding to the fluid surface. Additionally, the boundary region is determined by solving the level set equation for a non-zero level corresponding to a surface at the specified depth from the fluid surface. The set of spray particles inherit an initial state, for example a velocity, from the fluid simulation. Subsequent motion of the spray particles is determined according to a ballistic simulation, rather than a fluid simulation, thereby substantially reducing the computational burden required to animate the fluid. Spray particles that sink below a specified depth from the fluid surface are removed.

24 Claims, 8 Drawing Sheets

OTHER PUBLICATIONS

Enright, Douglas et al.; "Using the Particle Level Set Method and a Second Order Accurate Pressure Boundary Condition for Free Surface Flows"; *Proceedings of FEDSM'03, 2003 4th ASME JSME Joint Fluids Engineering Conference*, Jul. 6-11, 2003, Honolulu, Hawaii.

Enright, Douglas et al.; "Robust Treatment of Interfaces for Fluid Flows and Computer Graphics"; *Hyperbolic Problems: Theory, Numerics, Applications*, 2003, pp. 153-164.

Enright, Douglas et al.; "Animation and Rendering of Complex Water Surfaces"; *SIGGRAPH 2002, ACM TOG 21*, pp. 736-744, 2002.

Foster, Nick et al.; "Practical Animation of Liquids"; *SIGGRAPH 2001*, pp. 23-30, 2001.

Osher, Stanley et al.; "Level Set Methods: An Overview and Some Recent Results"; *Journal of Computational Physics* 2001 vol. 169 pp. 463-502.

* cited by examiner

WATER PARTICLE MANIPULATION

BACKGROUND OF THE INVENTION

The present invention relates to the field of computer graphics, and in particular to methods and apparatus for realistically animating water and other fluids. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Realistically animating water and other fluids presents a particular challenge. The behavior of a fluid, for example a churning ocean, has a number of different characteristics that are difficult to animate by hand. To assist animators, simulations of fluid dynamics are often used to animate the fluid according to parameters defined by animators. In a typical fluid dynamics simulation, the fluid is modeled as a set of particles. The simulation solves a system of equations defining the dynamic behavior of the fluid to determine the motion of the set of particles. The result of the simulation is a set of particles imitating the behaviors of the fluid, such as waves, splashes, eddies, currents and ripples.

Although the set of particles animated by a typical simulation technique move, as a whole, like a fluid, it often does not look like a fluid if rendered directly. Typically, the number of particles in a set is too small to give the appearance of a continuous surface of a fluid. Some rendering techniques render particles as metaballs, which are "blobs" that stretch or deform themselves into a continuous "goo." However, metaballs give the surface of the fluid a lumpy appearance, similar to rice pudding, which is unacceptable for representing fluids such as water. Another rendering technique creates an isosurface from the set of particles. The isosurface creates a smooth, spatially-continuous fluid surface; however, this surface is temporally discontinuous due to frame-to-frame noise. As a results, the motion of the isosurface appears jerky and discontinuous.

One rendering technique to create a smooth-looking fluid from the set of particles creates a level set representing the fluid surface from the set of particles. The level set is created from a signed distance function of the set of particles. The values of the level set are adjusted for each frame of animation from the velocities of the set of particles. This results in a fluid surface that is spatially continuous, i.e. smooth-looking, and temporally continuous, i.e. smoothly-animated.

Although level-sets provide a smooth-looking fluid, the relatively small number of particles used for the simulation does not allow for the fluid to form "sprays" as waves break or recede. The resulting fluid appears sterile and artificial. Increasing the number of particles in the fluid simulation may allow for a more realistic spray; however, this greatly increases the computational burden of the simulation. Additionally, the use of additional simulation particles is wasteful, as the majority of particles, such as those below the fluid surface, do not form sprays.

It is therefore desirable to have a system and method for creating realistic-looking sprays for simulated fluids. It is further desirable that the sprays do not increase the computational burden of the fluid simulation or rendering.

BRIEF SUMMARY OF THE INVENTION

An embodiment of the invention creates realistic sprays for simulated fluids by adding a set of spray particles to a boundary region just below the fluid surface. The set of spray particles inherit an initial state, for example a velocity, from the fluid simulation. Subsequent motion of the spray particles is determined according to a ballistic simulation, rather than a fluid simulation, thereby substantially reducing the computational burden required to animate the fluid. Spray particles that sink below a specified depth from the fluid surface are removed.

In an embodiment, a method of animating a fluid includes determining a state of a set of fluid particles at a first instance of time using a fluid simulation and defining a fluid surface from the state of the set of fluid particles. A boundary region is then defined between the fluid surface and a specified depth from the fluid surface. A plurality of spray particles are added to the boundary region. The plurality of spray particles is assigned a state based derived from the state of the set of fluid particles. The plurality of spray particles are moved according to at least the state of the plurality of spray particles, and a portion of the plurality of spray particles that are located below the specified depth from the fluid surface are removed.

In a further embodiment, a ballistic simulation moves the plurality of spray particles. In an additionaly embodiment, the method includes rendering the fluid surface and rendering a portion of the plurality of spray particles located above the fluid surface.

In another embodiment, the fluid surface is determined by solving a level set equation for a zero level corresponding to the fluid surface. Additionally, the boundary region is determined by solving the level set equation for a non-zero level corresponding to a surface at the specified depth from the fluid surface.

BRIEF DESCRIPTION OF THE DRAWINGS

The invention will be described with reference to the drawings, in which:

FIGS. 2A and 2B illustrate a prior technique for creating an animated fluid;

DETAILED DESCRIPTION OF THE INVENTION

Figure 1:
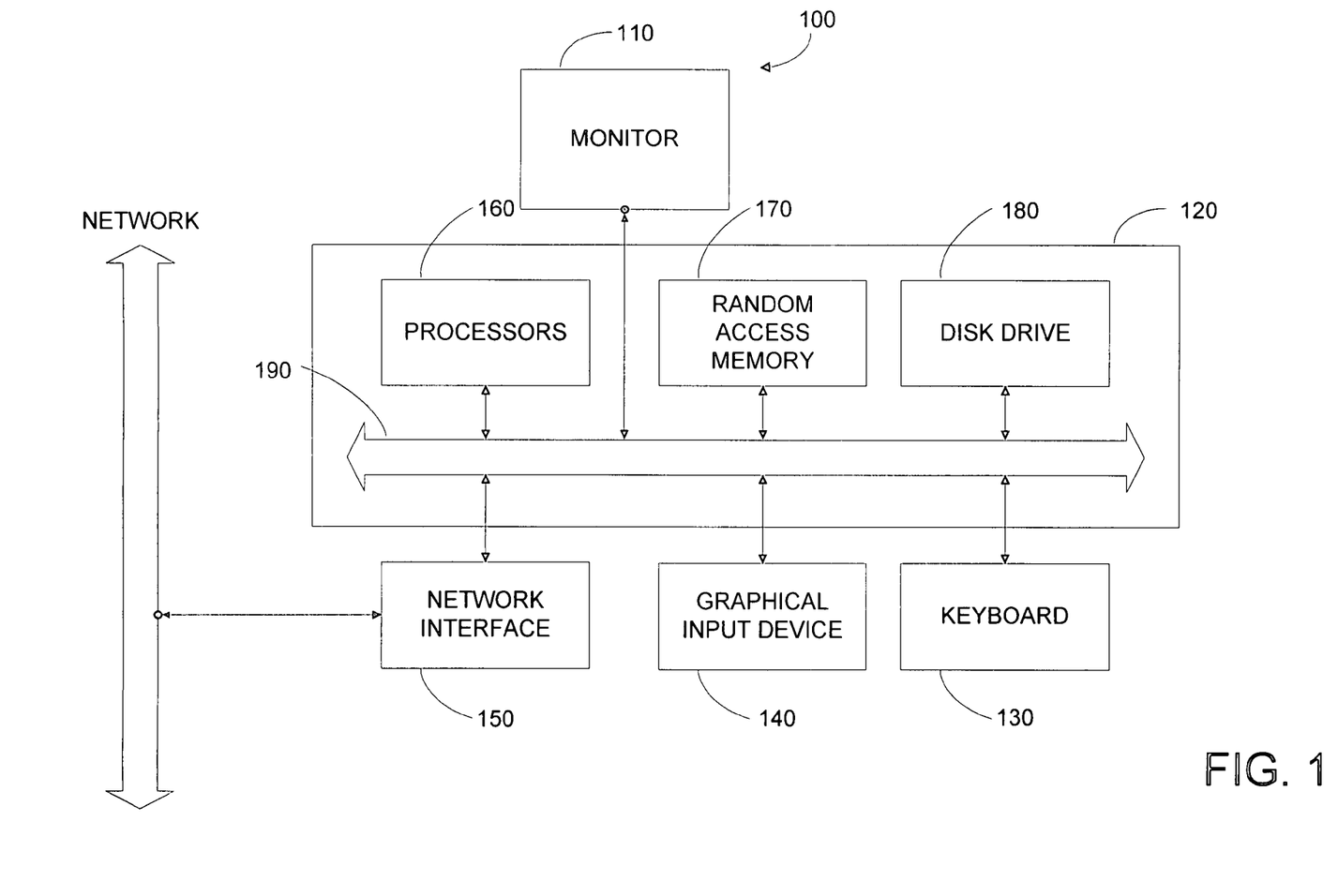
FIG. 1 illustrates a general-purpose computing system suitable for implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
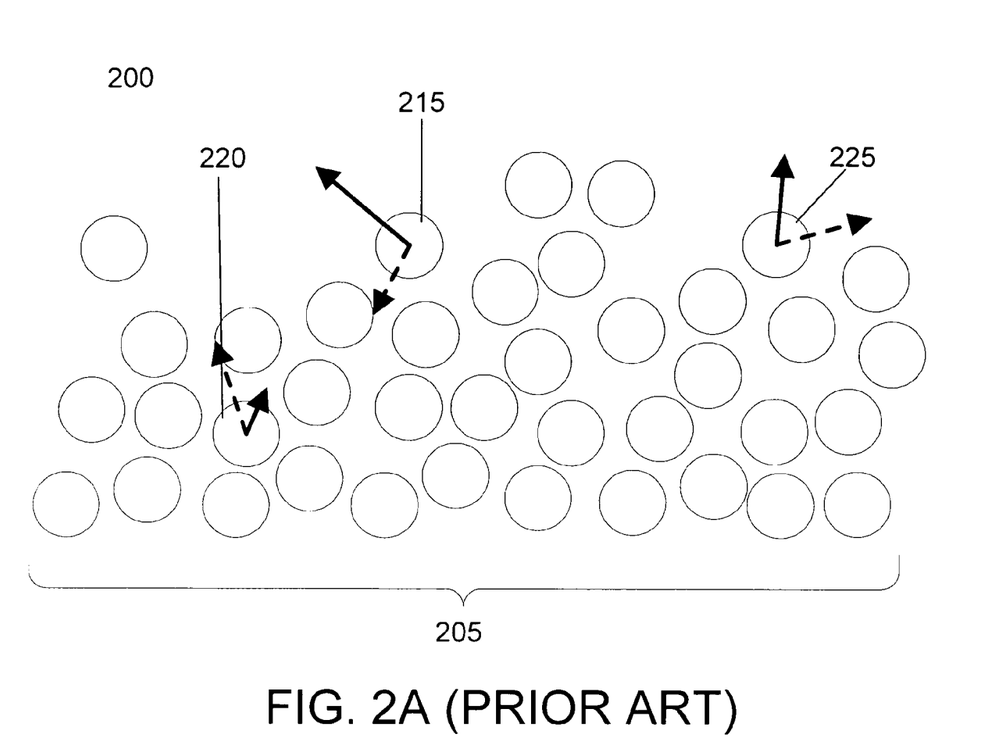

FIGS. 2A and 2B illustrate a prior technique for creating an animated fluid. FIG. 2A illustrates a close-up view of a fluid simulation 200 over a small region of the fluid surface. Simulation 200 models the behavior of a fluid as a set of particles 205. In FIGS. 2A and 2B, the fluid is animated in two-dimensions for clarity; however, fluids are typically animated in three-dimensions. The simulation 200 solves a system of fluid dynamics equations to determine the forces on each particle in the set 205, which in turn determines the acceleration, velocity, and position of each particle in the set 205. For example, particles 215, 220, and 225 each have a velocity, represented by a solid arrow, and an acceleration, represented by a dashed arrow. Together, these parameters represent at least a portion of the state of the set of particles 205. The simulation 200 determines the state of the set of particles 205 for each frame of the animation.

As discussed above, although the set of particles 205 behaves, as a whole, like a fluid, the set of particles 205 do not create the smooth, continuous surface needed for rendering the fluid. To create a smooth fluid surface, a level set is created from the set of particles. FIG. 2B illustrates an example level set 250 created from the state of the set of particles 205. Region 270 corresponds to the close up view of the particle simulation shown in FIG. 2A The level set 250 is a signed distance function giving a value corresponding to the distance from the surface of the fluid. Zero level lines 255, 260, and 265 represent the surface of the fluid, which are the portions of the level set with a value of zero. In the example of FIG. 2B, the zero level lines can be visualized as the outlines of drops of fluid resting on a flat sheet.

Figure 3:
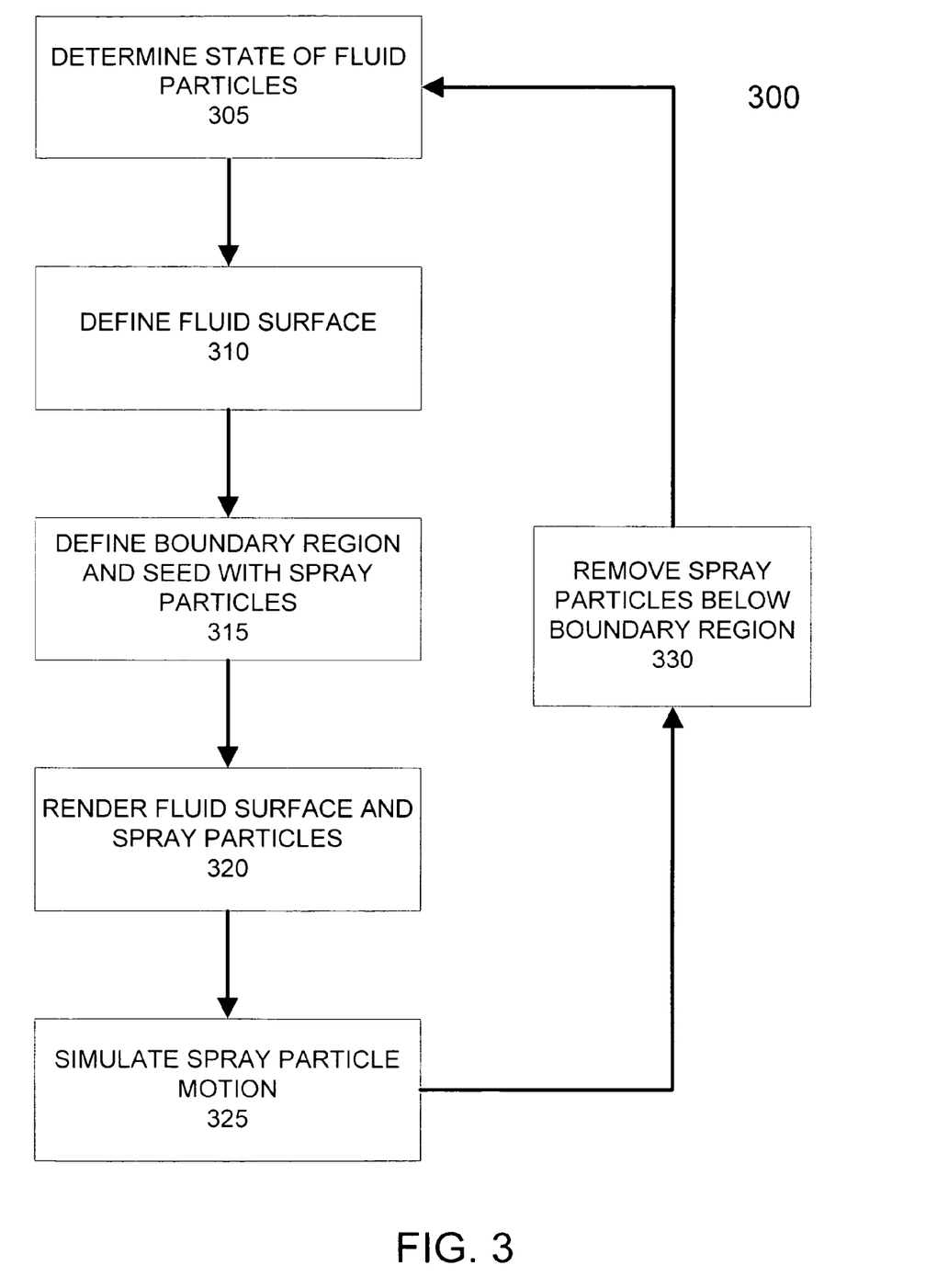
FIG. 3 illustrates a method for creating an animated fluid with sprays according to an embodiment of the invention.

FIG. 3 illustrates a method 300 for creating an animated fluid with sprays according to an embodiment of the invention. At step 305, the state of a set of fluid particles is determined for a given instant of time. In an embodiment, a fluid dynamics simulation using smooth particle hydrodynamics (SPH) is used to determine the forces on each one of the set of fluid particles, which in turn determines the state of the set of fluid particles at a given instant of time. In an example implementation, the fluid dynamics simulation determines the state of 10,000 to 1,000,000 fluid particles. Dynamic behaviors, such as waves, are initiated in the fluid dynamics simulation as pressure forces induced by collisions with boundary objects.

Following the determination of the state of the set of fluid particles, a fluid surface is defined from the state of the set of fluid particles at step 310. The purpose of step 310 is to create a continuous surface for the fluid to be used during rendering. In an embodiment, the fluid surface is the zero level of a level set. The level set is initialized using a signed distance function that represents the distance from an arbitrary point in space to the fluid surface forms the level set. In the case of a two-dimensional fluid, as shown in the examples, the level set is a three dimensional surface. In the case of a three-dimensional fluid, the level set is a four dimensional surface.

A level set equation is solved to determine the location of the zero level of the level set at a given point in time, t. An example level set equation is:

$$\phi_t + F|\nabla \phi| = 0.$$

In this example equation, $\phi$ is the signed distance function to the zero level surface, which is a function of position and time, and the F represents the velocity of the zero level surface, which as discussed below is determined from the set of fluid particles. In an embodiment, the space around the set of fluid particles is discretized into a grid of points. The velocity values of fluid particles adjacent to grid points are weighted to determine an average velocity for each grid point. The average velocity of each grid point, in conjunction with the partial derivatives of the level set function are used to find the solution of the level set equation. In an example implementation, a "nudging" solver is used to solve the level set equation and to incrementally update the level set over time, allowing a solution that appears continuous over time but which does not diverge from the set of fluid particles. The solution of the level set equation defines the zero level surface at the given instant of time. In an embodiment, the surface of the fluid is created by trilinearly interpolating the position of zero level surface from the grid. The surface of the fluid can be rendered as a polygonal mesh using the values of the level set to determine surface normals.

Figure 4A:
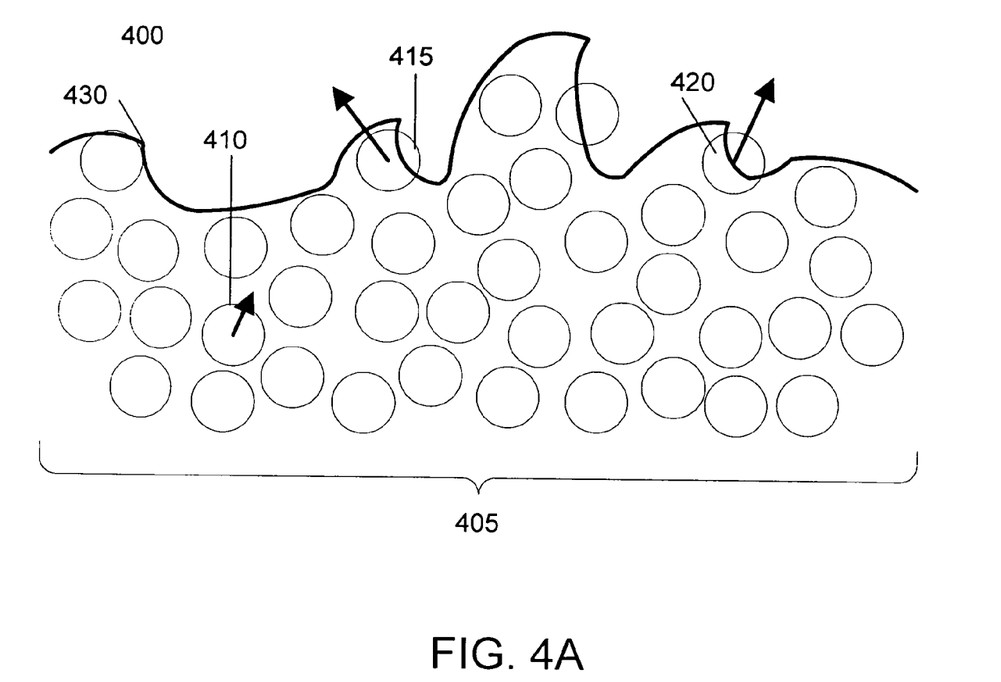
FIGS. 4A-4F illustrate the creation of an animated fluid with sprays for an example fluid according to an embodiment of the invention.

FIGS. 4A and 4B illustrate an example implementation of steps 305 and 310 of method 300. FIG. 4A illustrates a close-up view of a fluid simulation 400 over a small region of the fluid surface. Fluid simulation 400 models the behavior of a fluid as a set of particles 405. Simulation 400 solves a system of fluid dynamics equations to determine the forces on each particle in the set 405, which in turn determines the acceleration, velocity, and position of each particle in the set 405. For example, particles 410, 415, and 420 each have a velocity, represented by a solid arrow.

Figure 4B:
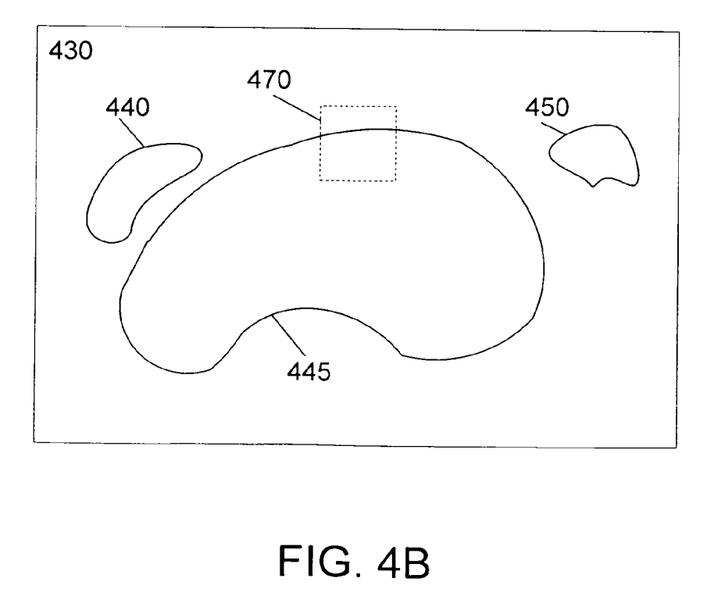

A level set 430 defining the surface of the fluid is created by weighting the velocities of particles adjacent to grid points to determine a velocity for each grid point. The velocity of the grid points, along with the partial derivatives of the level set function, are used to find the solution of the level set equation and thus the location of the zero level of the level set function at a given point of time. The zero level 430 corresponds to the surface of the fluid. FIG. 4B illustrates example level set 430 view from above. Contour lines 440, 445, and 450 indicate the portions of the level set 430 at the zero level. Region 470 corresponds to the close up view of the particle simulation shown in FIG. 4A.

Following step 310, in which a fluid surface is defined at a given instant of time, step 315 determines a boundary region to be used in the creation of spray. The boundary region is a region of the space just beneath the fluid surface. In an embodiment, the boundary region is determined from the level set function previously used to determine the fluid surface. In this embodiment, the level set equation is modified to solve for a non-zero level, for example one centimeter below the surface. An example level set equation for finding the desired non-zero level might be:

$$\phi_t + F|\nabla\phi| = -0.01$$

Because the level set function is based on the signed distance function, a boundary region any thickness can be defined by solving the level set equation for the desired thickness value. The resulting non-zero level corresponds to the inner surface of the boundary region, with the outer surface of the boundary region being the fluid surface.

Once the boundary region is defined, a set of spray particles is added, or seeded to the boundary region. The spray particles are assigned a velocity based on the weighted velocity of adjacent grid points. In an example implementation, the density of spray particles added to the boundary region ranges from ten to 100 times the density of the set of simulation particles.

Figure 4C:
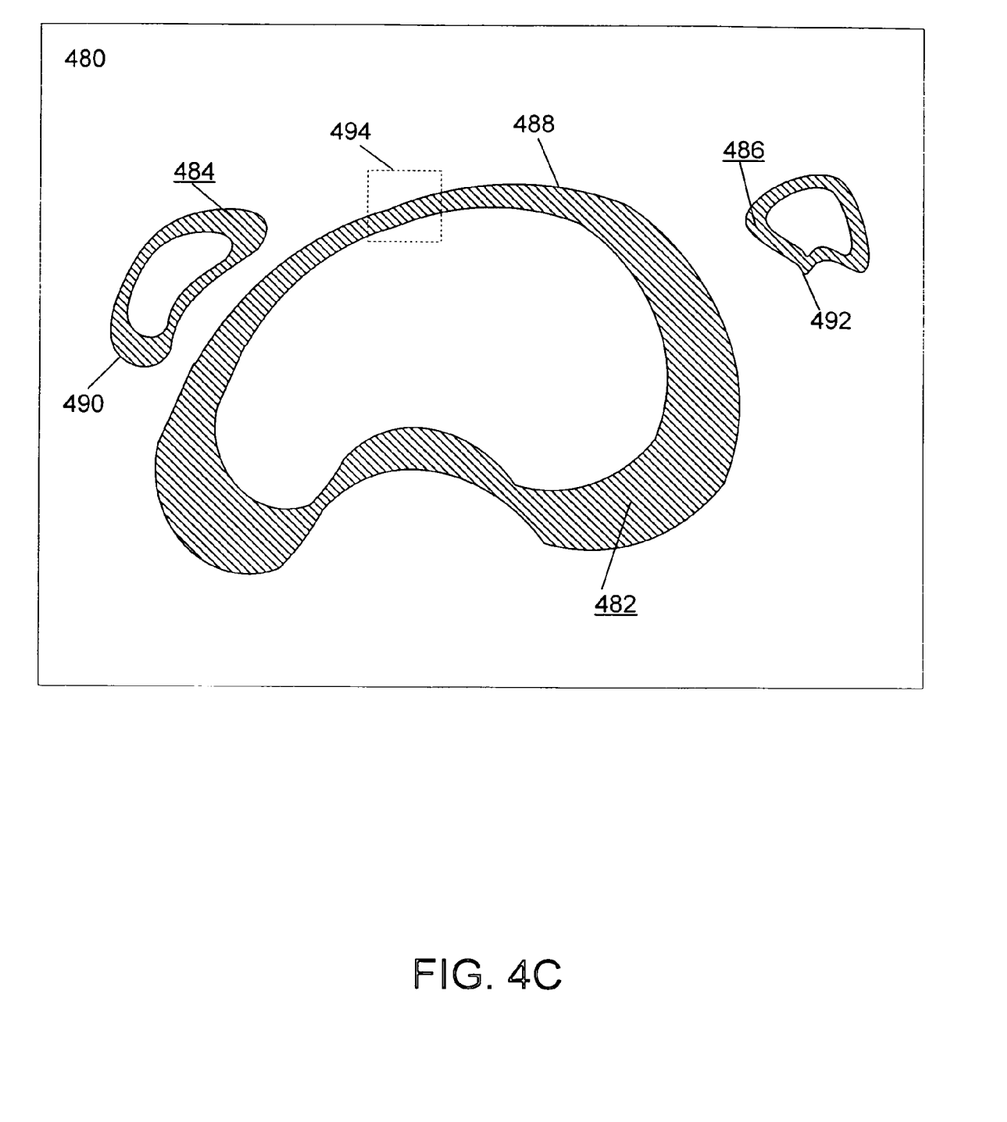
Figure 4D:
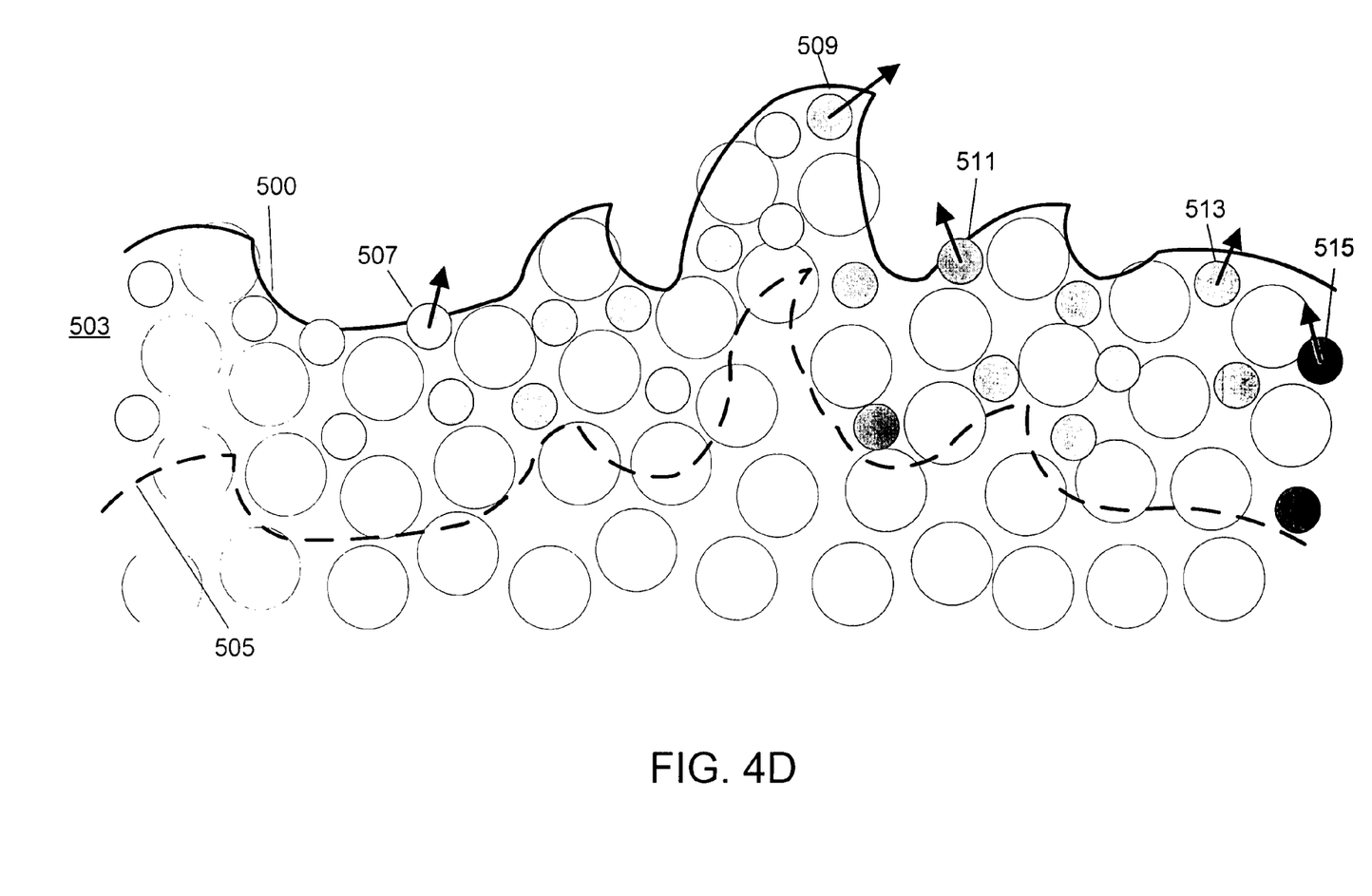

FIGS. 4C and 4D illustrate an example implementation of step 315. FIG. 4C illustrates an example level set 480. The level set 480 includes zero level boundaries 488, 490, and 492, representing the surface of the fluid. The boundary regions 482, 484, and 486 are formed in this example by finding a non-zero level of the level set function. Once the boundary region is defined, a set of spray particles are seeded into the boundary region.

FIG. 4D illustrates a close-up view of region 494 of FIG. 4C, showing the seeding of spray particles within the boundary region. Zero level 500, defining the surface of the fluid, and non-zero level 505 define the boundary region 503. Within the boundary region 503, a number of spray particles, shown in gray, have been added. Each spray particle is assigned a velocity based on the weighted average of the velocity of adjacent grid points. For example, spray particles 507, 509, 511, 513, and 515 have each been assigned a velocity, shown with an arrow.

At step 320, the zero level and the spray particles are rendered to create an output image. In an embodiment, spray particles are only rendered if they are above the surface of the fluid. Although initially all of the spray particles will be found within the boundary region underneath the fluid surface, eventually some spray particles will travel above the surface of the fluid, as discussed below. Rendering can be performed using any technique, for example ray-tracing or scanline rendering, in combination with lighting, shading, texture mapping, and any other image processing information to create a final image or frame. As it is often desirable to animate a fluid in the context of other entities, step 320 may also integrate unrelated objects, images, and other entities into the rendering. In an alternate embodiment, the location of the zero level and the spray particles is stored and rendering is deferred until a later time.

At step 325, the motion of the spray particles is simulated in preparation for the next frame of animation. Unlike the fluid particles, which are moved according to a complex fluid simulation, the spray particles are moved according to a ballistic simulation. For example, each spray particle is displaced by a distance equal to the product of its velocity and the time increment between frames. Each spray particle's velocity is then added to an acceleration vector, representing the force of gravity, with the result stored as the spray particle's new velocity. The acceleration vector, which determines how long a spray "floats," can be changed in value to achieve the desired aesthetic effect. Because the spray particles are not animated with a computationally expensive fluid simulation, the addition of the spray particles does not adversely effect the performance of the overall fluid animation. As discussed below, method 300 is repeated for each frame of fluid animation. It should be noted that step 325 simulates the motion of all of the spray particles in the system, including any remaining from previous iterations of the method 300.

Figure 4E:
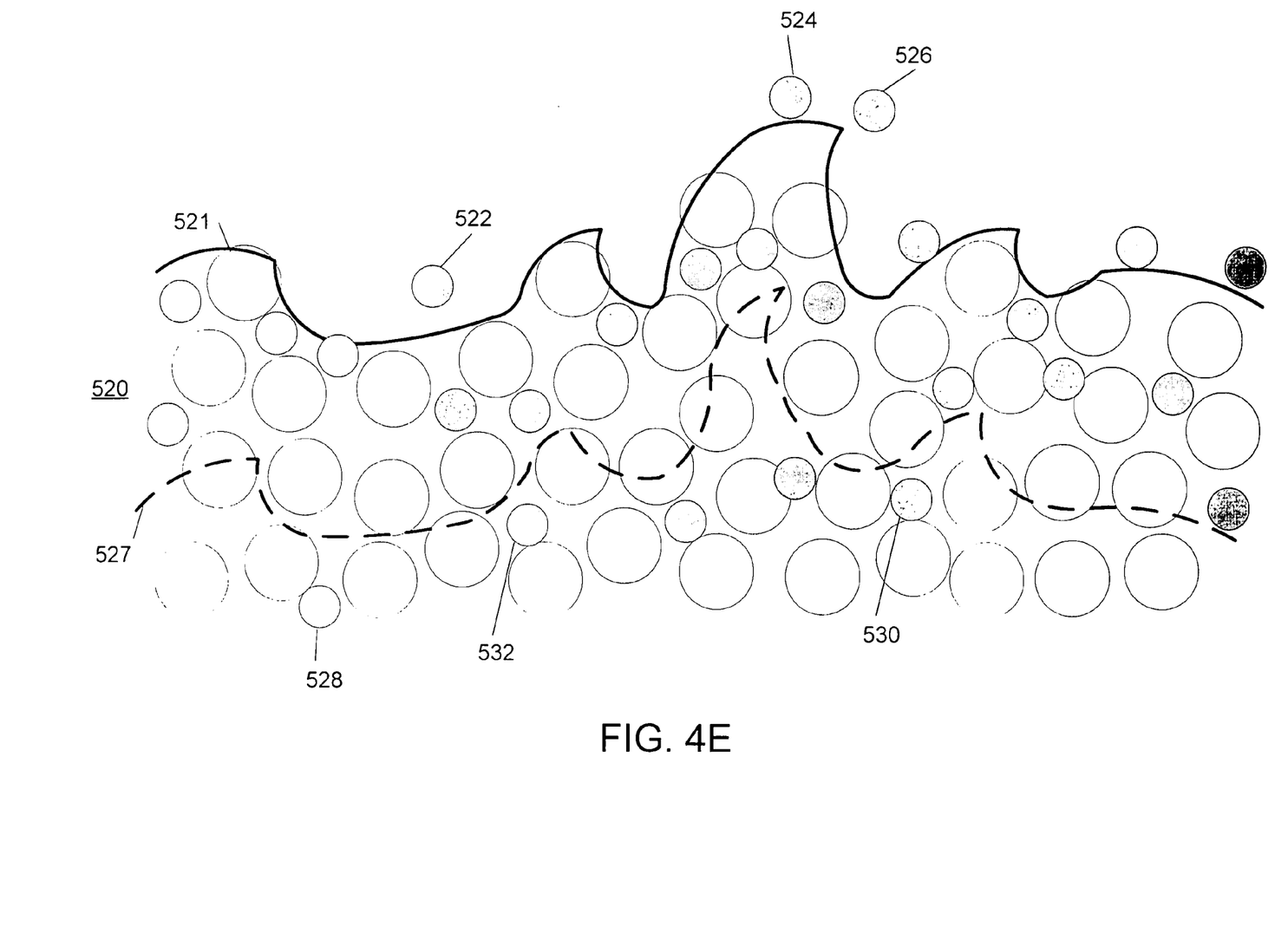

FIG. 4E illustrates an example implementation of step 325. In FIG. 4E, some of the spray particles, such as spray particles 522, 524, and 526, have traveled outside the boundary region 520 and above the fluid surface 521. Similarly, spray particles 528, 530, and 532 have sunk below the inner surface 527 of the boundary region 520.

Figure 4F:
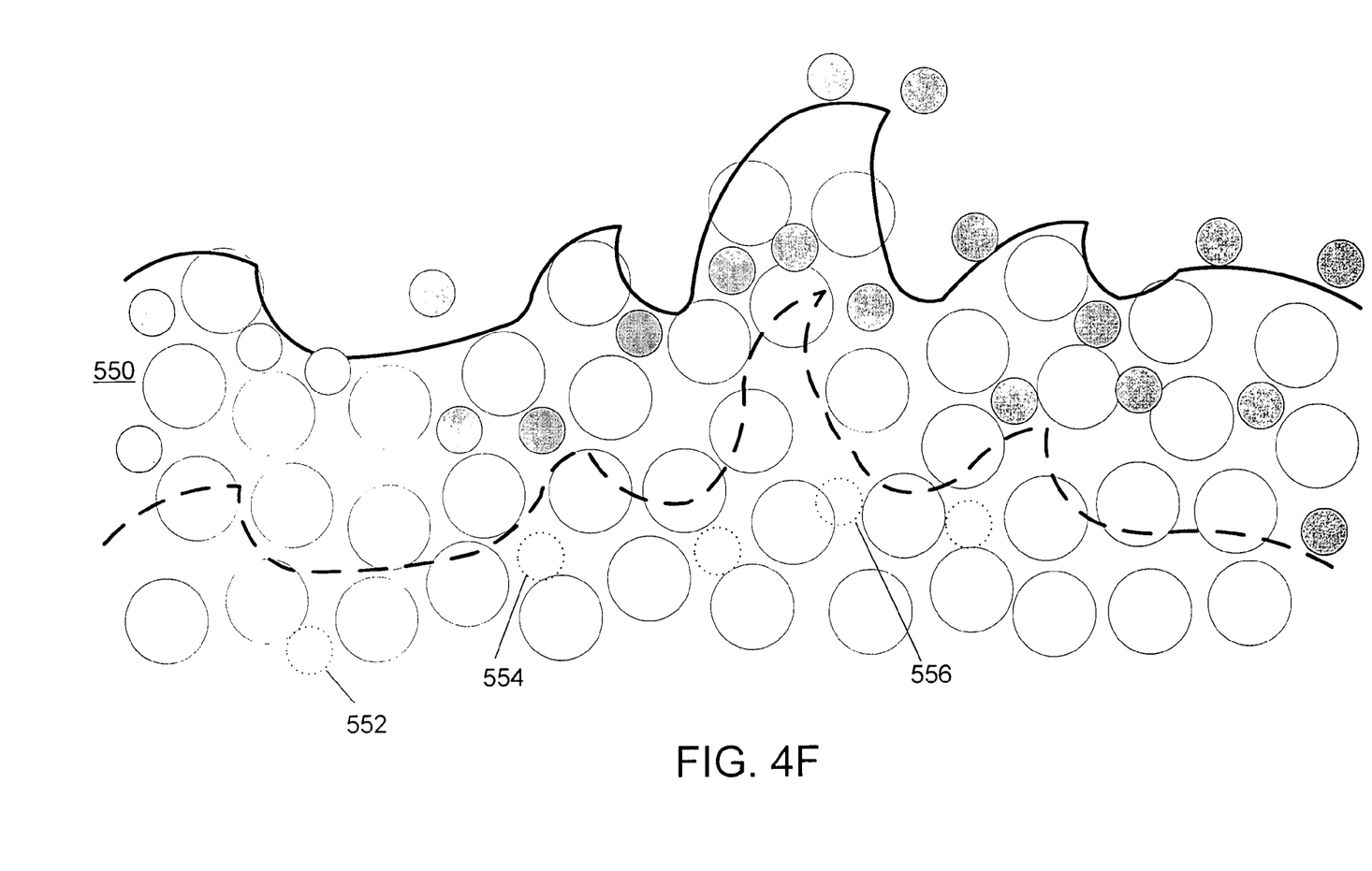

In an embodiment, it is assumed that spray particles that sink below the boundary region will never rise above the fluid surface to become visible again. Thus, step 330 removes from the simulation the spray particles that have moved below the boundary region. FIG. 4F illustrates an example implementation of step 330, in which the spray particles 552, 554, and 556 have sunk below the boundary region 550 and have been removed. In FIG. 4F, the removed spray particles are shown in outline. In an embodiment, the same boundary region is used both for seeding new spray particles and removing old spray particles. However, alternate embodiments can define separate boundary regions for seeding new spray particles and removing old spray particles.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of animating fluid, comprising:
   determining a fluid surface at a first time value according to a fluid simulation;
   adding at least one spray particle beneath the fluid surface, the spray particle having an initial state derived at least in part from the attributes of the fluid simulation;
   moving the spray particle independently of the fluid simulation according to at least its initial state;
   rendering the fluid surface; and
   rendering the spray particle in response to the spray particle being above the fluid surface.

2. The method of claim 1, wherein determining a fluid surface comprises:
   solving a level set equation to determine a zero level corresponding to the fluid surface.

3. The method of claim 2, wherein determining a fluid surface further comprises:
   simulating a set of fluid particles to determine a state of the set of fluid particles at the first time value; and
   solving the level set equation to determine the zero level using the state of the set of fluid particles.

4. The method of claim 2, wherein adding at least one spray particle comprises:

solving the level set equation to determine a non-zero level corresponding to a boundary surface; and adding the spray particle to a boundary region between the fluid surface and the boundary surface.

5. The method of claim 4, further comprising:

removing the spray particle in response to the spray particle being below the boundary surface.

6. The method of claim 1, wherein adding at least one spray particle comprises adding the spray particle to a region within a specified depth from the fluid surface.

7. The method of claim 6, further comprising:

removing the spray particle in response to the spray particle being below the specified depth from the fluid surface.

8. The method of claim 1, wherein moving the spray particle comprises moving the spray particle in accordance with a ballistic simulation based upon at least the initial state of the spray particle.

9. The method of claim 8, wherein the ballistic simulation includes an approximation of the force of gravity on the spray particle.

10. The method of claim 1, further comprising:

determining the fluid surface at a second time value according to the fluid simulation;

adding at least one additional spray particle beneath the fluid surface, the additional spray particle having an initial state derived at least in part from the attributes of the fluid simulation; and moving the spray particle and the additional spray particle independently of the fluid simulation according to at least their respective initial states.

11. A method of animating a fluid, comprising:

determining a state of a set of fluid particles at a first instance of time using a fluid simulation;

defining a fluid surface from the state of the set of fluid particles;

defining a boundary region between the fluid surface and a specified depth from the fluid surface;

adding a plurality of spray particles to the boundary region, wherein the plurality of spray particles is assigned an initial state derived at least in part from the state of the set of fluid particles;

moving the plurality of spray particles independently of the fluid simulation according to at least the initial state of the plurality of spray particles;

removing a portion of the plurality of spray particles in response to the portion of the plurality of spray particles being located below the specified depth from the fluid surface;

rendering the fluid surface; and rendering a second portion of the plurality of spray particles.

12. The method of claim 11, wherein the second portion of the plurality of spray particles is located above the fluid surface.

13. The method of claim 11:

wherein determining the fluid surface comprises solving a level set equation for a zero level corresponding to the fluid surface; and wherein determining the boundary region comprises solving the level set equation for a non-zero level corresponding to a surface at the specified depth from the fluid surface.

14. The method of claim 11, wherein moving the plurality of spray particles comprises:

moving the plurality of spray particles in accordance with a ballistic simulation.

15. An information storage medium having a set of instructions adapted to direct an information processing device to perform an operation comprising the steps of:

determining a fluid surface at a first time value according to a fluid simulation;

adding at least one spray particle beneath the fluid surface, the spray particle having an initial state derived at least in part from the attributes of the fluid simulation; and moving the spray particle independently of the fluid simulation according to at least its initial state;

rendering the fluid surface; and rendering the spray particle in response to the spray particle being above the fluid surface.

16. The information storage medium of claim 15, wherein determining a fluid surface comprises:

solving a level set equation to determine a zero level corresponding to the fluid surface.

17. The information storage medium of claim 16, wherein determining a fluid surface further comprises:

simulating a set of fluid particles to determine a state of the set of fluid particles at the first time value; and solving the level set equation to determine the zero level using the state of the set of fluid particles.

18. The information storage medium of claim 16, wherein adding at least one spray particle comprises:

solving the level set equation to determine a non-zero level corresponding to a boundary surface; and adding the spray particle to a boundary region between the fluid surface and the boundary surface.

19. The information storage medium of claim 18, further comprising:

removing the spray particle in response to the spray particle being below the boundary surface.

20. The information storage medium of claim 15, wherein adding at least one spray particle comprises adding the spray particle to a region within a specified depth from the fluid surface.

21. The information storage medium of claim 20, further comprising:

removing the spray particle in response to the spray particle being below the specified depth from the fluid surface.

22. The information storage medium of claim 15, wherein moving the spray particle comprises moving the spray particle in accordance with a ballistic simulation based upon at least the initial state of the spray particle.

23. The information storage medium of claim 22, wherein the ballistic simulation includes an approximation of the force of gravity on the spray particle.

24. The information storage medium of claim 15, further comprising:

determining the fluid surface at a second time value according to the fluid simulation;

adding at least one additional spray particle beneath the fluid surface, the additional spray particle having an initial state derived at least in part from the attributes of the fluid simulation; and moving the spray particle and the additional spray particle independently of the fluid simulation according to at least their respective initial states.

* * * * *